United States Patent [19]

Yamaki et al.

[11] Patent Number: 4,527,155
[45] Date of Patent: Jul. 2, 1985

[54] SYSTEM FOR MAINTAINING AN ORIENTATION OF CHARACTERS DISPLAYED WITH A ROTATABLE IMAGE

[75] Inventors: Kiyoshi Yamaki; Hidetaka Suzuki; Haruto Tanaka; Yasuhisa Takeuchi, all of Yokosuka, Japan

[73] Assignee: Nissan Motor Company, Limited, Yokohama, Japan

[21] Appl. No.: 354,036

[22] Filed: Mar. 2, 1982

[30] Foreign Application Priority Data

Mar. 4, 1981 [JP] Japan ................... 56-30700

[51] Int. Cl.³ .................... G09G 1/00; G09G 3/00
[52] U.S. Cl. .................... 340/727; 340/721; 340/724; 340/990; 340/995
[58] Field of Search ............ 340/721, 727, 24, 723, 340/724, 745, 990, 995; 364/434, 448, 449

[56] References Cited

U.S. PATENT DOCUMENTS

| 2,464,057 | 3/1949 | Phair . | |
|---|---|---|---|
| 3,520,994 | 7/1970 | McAfee et al. | 340/721 |
| 3,821,729 | 6/1974 | Schultze | 340/727 |
| 4,138,726 | 2/1979 | Girault et al. | 340/995 |
| 4,149,148 | 4/1979 | Miller et al. | 340/721 |
| 4,312,577 | 1/1982 | Fitzgerald . | |
| 4,317,114 | 2/1982 | Walker | 340/721 |
| 4,360,876 | 11/1982 | Girault et al. | 340/995 |
| 4,366,475 | 12/1982 | Kishi et al. . | |
| 4,416,066 | 11/1983 | Romacker . | |

FOREIGN PATENT DOCUMENTS

| 237568 | 8/1926 | United Kingdom . |
|---|---|---|
| 1065563 | 4/1967 | United Kingdom . |
| 1077003 | 7/1967 | United Kingdom . |
| 1337960 | 11/1973 | United Kingdom . |
| 1452608 | 10/1976 | United Kingdom . |

*Primary Examiner*—Gerald L. Brigance
*Attorney, Agent, or Firm*—Schwartz, Jeffery, Schwaab, Mack, Blumenthal & Evans

[57] ABSTRACT

A display of images on a screen which is installed in an automotive vehicle for displaying the driving direction and location of the automotive vehicle within a graphic pattern, such as a drive map, comprising: (a) a screen device; (b) a first memory unit in which data of a graphic pattern to be displayed on said screen device is stored; (c) a second memory unit in which at least one word and mark to be superimposed on the graphic pattern and those positional data on the graphic pattern are stored; (d) a signal generator which outputs a command signal to rotate the graphic pattern on said screen unit by an angle with respect to an original position; (e) a shift circuit which shifts the positions of all words and marks stored in said second memory unit to those rotated at the angle corresponding to the command signal from said signal generator; and (f) an image control unit which controls the display of graphic pattern rotated by the angle corresponding to the command signal from said signal generator on said screen unit and controls the superimposition of at least one word and mark stored in said second memory unit on the position of the graphic pattern shifted by said shift circuit.

6 Claims, 7 Drawing Figures

TRAVELING DIRECTION

TRAVELING DIRECTION 4,527,155

SYSTEM FOR MAINTAINING AN ORIENTATION OF CHARACTERS DISPLAYED WITH A ROTATABLE IMAGE

BACKGROUND OF THE INVENTION

1. Field of the Invention

The present invention relates to systems which simultaneously display graphic, character, and other images on a matrix screen and then rotate the image. It relates specifically to a road map labeled with alphanumeric characters.

2 Description of the Prior Art

A conventional display system of the type which is, for example, mounted in front of the driver'seat of an automotive vehicle for displaying a road map on a screen includes a single memory for storing all graphic pattern data. This memory has a storage capacity corresponding to the number of picture elements on the display screen such that the graphic data, character data, and other data (such as size and position data for the characters constituting each word indicating, e.g., a place-name) are stored integrally. The display system also includes a signal generator for generating and outputting a rotation angle signal to rotate the graphic image on the screen, such as from a vehicle traveling directional detector of the type disclosed in U.S. Pat. No. 2,464,057, which outputs a voltage signal which varies according to changes in the direction in which the vehicle travels, and a display control circuit which controls the data stored in the graphic memory according to the rotation angle signal from the signal generator.

Such a conventional display system as described above, however, has the problem that the characters displayed with the map are rotated along with the map. Thus, it takes time for a driver to recognize the alphanumerals and marks superimposed on the map pattern, reversed or inclined as they are with respect to upright on the screen, after the image on the screen is rotated through an angle according to the change in traveling direction of the automotive vehicle.

SUMMARY OF THE INVENTION

With the above-described problem in mind, it is an object of the present invention to provide a system for the display of images on a screen wherein graphic data such as a map and alphanumeric and mark data are stored in separate memory units, one memory unit storing the alphanumeric and other mark data as well as positional data on a coordinate position of the characters to be displayed on the screen, and the other memory storing the graphic pattern data, so that the alphanumerals and other marks, etc., are shifted integrally into a position rotated with respect to the graphic pattern so as to provide an upright view of the characters for a driver when the graphic image is rotated through any given angle.

BRIEF DESCRIPTION OF THE DRAWINGS

The features and advantages of the present invention will be better appreciated from the following description taken in conjunction with the accompanying drawings in which like reference numerals designate corresponding elements, in which.

DETAILED DESCRIPTION OF THE PREFERRED EMBODIMENT

Reference will be made to the drawings and first to FIG. 1 which is a simplified block diagram of a conventional system for display of images on a screen.

Figure 1:
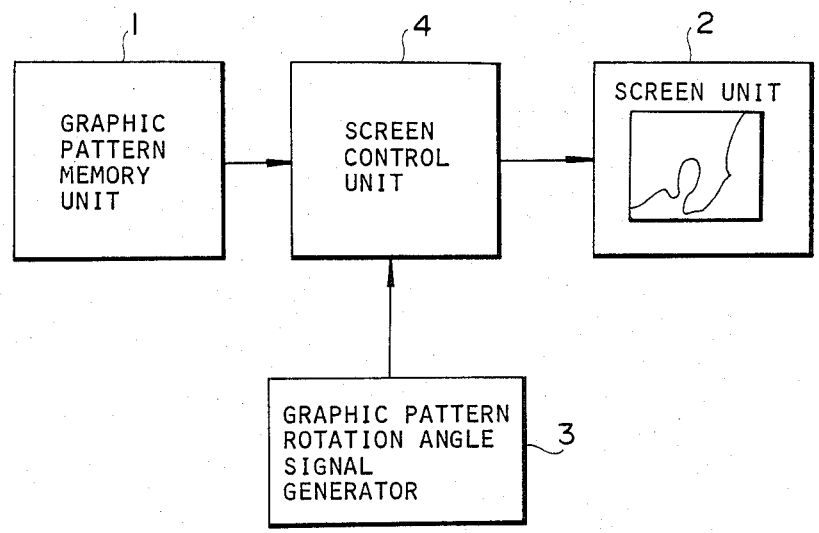
FIG. 1 is a functional block diagram of a conventional system for display of images on a screen.

FIG. 1 shows a the conventional system for display of images on the screen which comprises a memory unit 1 for storing graphic data having a storage capacity corresponding to the number of picture elements in the screen of a screen unit 2. Memory unit 1 also stores size and position data on characters when the characters are superimposed on the graphic pattern. This display system also has a graph rotational signal generator 3, e.g., a vehicle traveling detection device which outputs a rotation command signal on the basis of the change in the direction in which the vehicle travels; and a screen control unit 4 which controls the data stored in the memory unit 1 so that the graph pattern and alphanumerals are rotated through a specified angle depending on the output signal of the graph rotational signal generator 3 with respect to a horizontal angle.

Figure 2A:
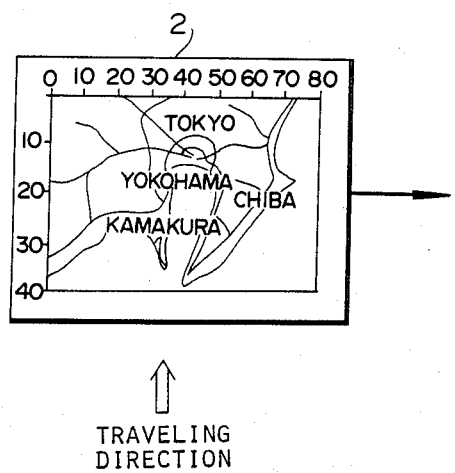
FIGS. 2(A) and (B) are diagrams of the same image on the screen viewed before a graphic pattern of a map is rotated and after the graphic image is rotated through a given angle.
Figure 2B:
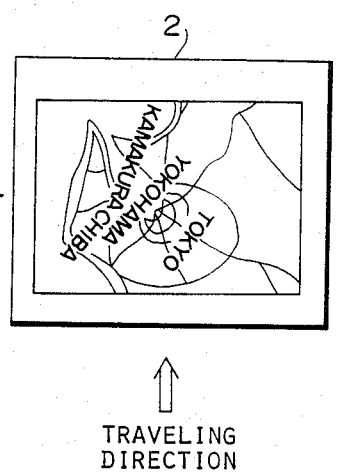

Such a conventional system for display of images on a screen has the problem that when a map represented in the form of graph is rotated in accordance with the direction in which the vehicle travels, the characters of a place-name, marks (e.g., symbolic representations of a post office, police station, shrine, etc.), and so forth are rotated therewith as shown in FIG. 2(B) from a reference position shown in FIG. 2(A) wherein a north-and-south direction is up and down on the screen 2.

Figure 3:
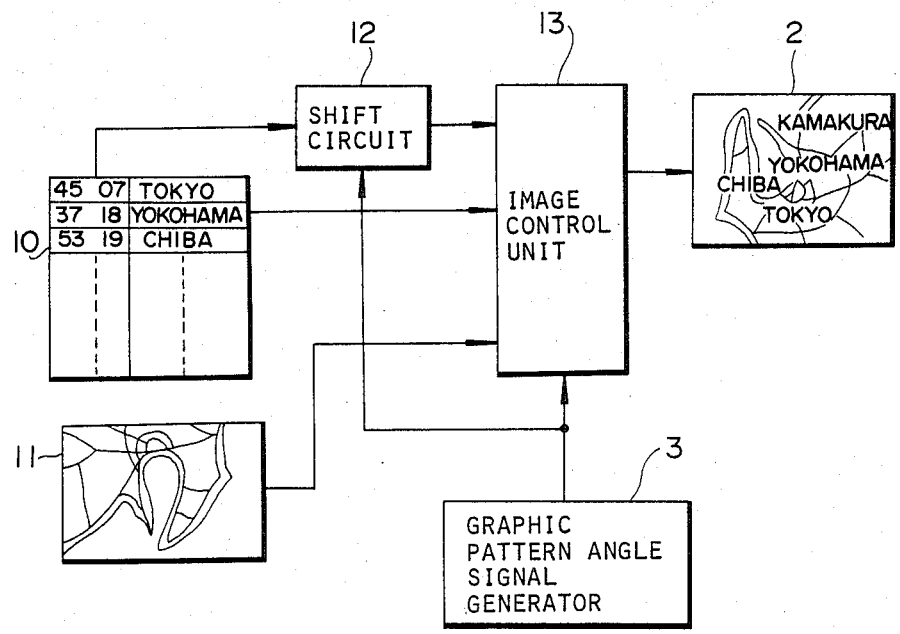
FIG. 3 is a block diagram of a system for display of images on a screen according to the present invention.

FIG. 3 is a circuit block diagram of a preferred embodiment according to the present invention. The system for display of images on the screen of FIG. 3 has a memory unit 10 which stores coded data corresponding to the alphanumerals indicating place-names and marks and display position (coordinate positions of the alphanumerals and marks), and another memory unit 11 which stores the graphic data such as a map to be displayed on the screen. It also has a coordinate position shift circuit 12 which reads X—Y coordinate positions of the alphanumerals or other marks from the memory unit 10 and shifts them into newly changed X—Y coordinate positions when the rotation for the graphic pattern on the screen 2 is made, shift circuit 12 functioning in accordance with the rotation angle signal received from signal generator 3 as is readily apparent from the line branching off to the left of signal generator 3's output line as illustrated in FIG. 3, and an image control unit 13 which rotates the graph to be displayed on screen 2 stored within the memory unit 11 according to the output indication of the graphic pattern rotation angle generator 3, reads the codes of the alphanumerals or marks stored within the memory unit 10, converts them to previously assigned letters or marks corresponding to the read and coded alphanumerals or marks, and furthermore controls them so that the letters or marks are superimposed on the displayed graph so as to provide an upright display of the alphanumerals or marks on the screen 2. The system for display of images on the screen of such construction as described above displays a graphic pattern rotated about a center of the screen 2 through an angle specified by the graphic pattern rotational angle generator 3. For the alphanumeric or symbolic data stored in the memory unit 10, the coordinate position shift circuit 12 reads coordinate position data such as that of letters and shifts these data into the corresponding coordinate positions after the graphic pattern is rotated through the specified angle. In addition, the image control unit 13 displays the words and marks on the screen 2 after fetching the codes of the alphanumerals or marks stored in the memory unit 10. Therefore, the words and marks are not rotated as seen by a viewer after the graphic pattern is rotated for indicating the vehicle travel direction. Consequently, the traveling direction of the vehicle can easily be recognized and the place-names symbol marks can rapidly be identified as well.

Furthermore, a method of controlling images on the screen is described hereinafter with reference to FIGS. 4, 5(A), and 5(B).

Figure 4:
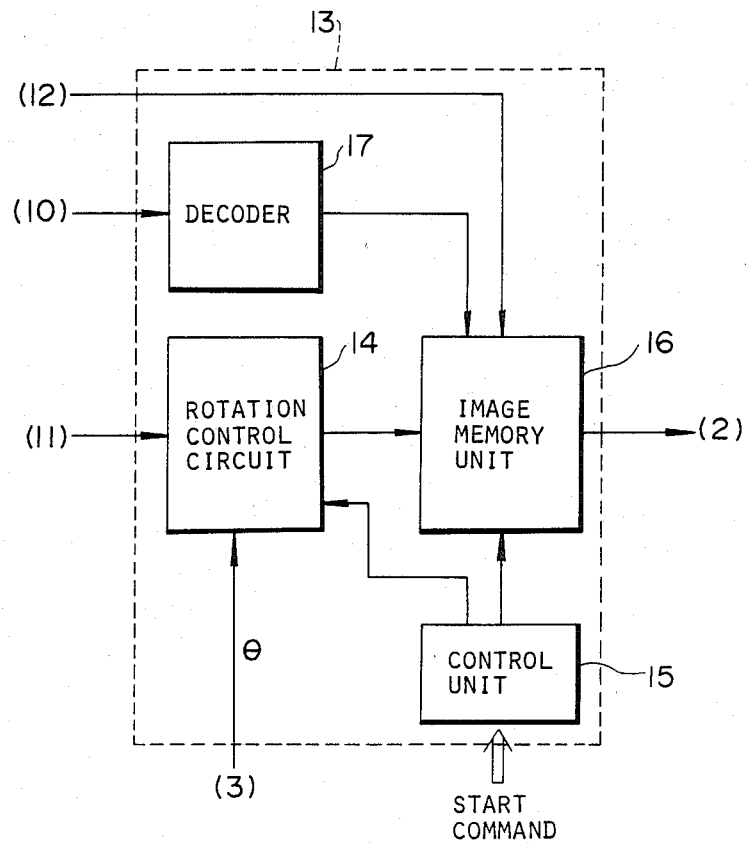
FIG. 4 is a block diagram of a control device of the images shown in the block by FIG. 3.
Figure 5A:
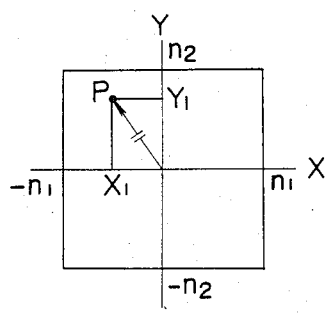
FIGS. 5(A) and (B) are diagrams of polar coordinates for explaining each position of the graphic image over a rotational position.
Figure 5B:
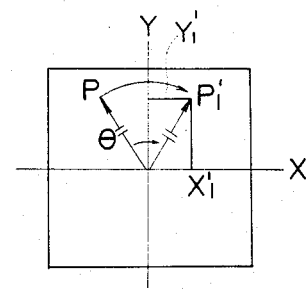

In FIG. 4, which shows an internal configuration of the image control unit 13 shown in FIG. 3, numeral 14 denotes a rotation control circuit for controlling the rotation angle of a graphic pattern fed from the memory unit 11. Rotation control circuit 14 receives the output indication of the graphic pattern rotation angle generator 3 to control the rotation angle of the graphic pattern, as described above. Numeral 17 denotes a decoder which receives codes on alphanumerals or marks representing place-names and marks stored in memory unit 10, decodes and sends them to an image memory unit 16, i.e., to addresses as specified by the shift circuit 12 according to the position data thereof. Numeral 15 denotes a control unit, the function of which will be described later. When an actuation signal or START command is received from a control unit 15, the rotation circuit 14 issues a command to transfer the stored data of the graphic memory unit 11 described above into an image memory unit 16 of a buffer type, e.g., RAM. At this time, a graphic pattern data stored in the memory unit 11 is transferred into the image memory unit 16 in such a way that the graphic pattern data is transferred sequentially into each location of the image memory unit 16 which corresponds to each coordinate position of the screen 2 after the graphic rotational angle signal generator 3 specifies the rotation control unit 14 to rotate $\theta$ with respect to the original position stored in the memory unit 11. In more detail, the graphic memory unit 11 has a storage capacity corresponding to the number of picture elements $2n_1 \times 2n_2$ as shown in FIG. 5(A). If a graphic pattern image is rotated with a center of the image as an axis (in this case, let the central coordinate be $X=0$, $Y=0$), the data of each picture element in the graphic memory unit 11 is read out sequentially and the position data is calculated in a polar coordinate system on a basis of the rotation angle $\theta$ given by the graphic rotation angle signal generator 3. The read data is stored in a coordinate position of the two-dimensional coordinate axis rotated at the angle $\theta$. At the time of polar coordinate calculation, consider the original coordinate position $P(X_1, Y_1)$ before such rotation is made and a new coordinate position $P'(X_1', Y_1')$ after the rotation through an angle $\theta$ is made as shown in FIG. 5(B), $P'(X_1', Y_1')$ is given by $$X_1' = X_1 \cos\theta + Y_1 \sin\theta$$

$$Y_1' = -X_1 \sin\theta + Y_1 \cos\theta.$$

Such a calculation as given by the above-described equations is made for each point of the coordinates $X = -n_1$ through $n_1$, $Y = -n_2$ through $n_2$.

If the calculation of trigonometric function is made through digital circuitry, either a technique of approximation, such as on a basis of Taylor's expansion, or a look-up table is used.

In this way, the image memory unit 16 stores a graphic pattern rotated at the angle of $\theta$ with respect to the graphic pattern stored in the graphic pattern memory unit 11 already described. For the alphanumeric and symbolic data, the data stored within the alphanumeric data memory unit 10 is decoded into the corresponding letters or marks by means of a decoder 17 the decoder output, i.e., letter and marks from decoder 17 is sent into the image memory unit 16 as appreciated from FIG. 4. The control unit 15 thus performs a control for the image memory unit 16 as seen from FIG. 4 so that these letters or marks are placed at the two-dimensional coordinates indicated by the coordinate position shift circuit 12.

As a result of this, a graphic pattern rotated through an angle of $\theta$ with respect to that stored within the graphic pattern memory unit 11 and letters and marks whose positions are accordingly adjusted, as described above, are stored within the image memory unit 16 and displayed on the screen 2 sequentially by means of the control unit 15. As appreciated from the description and drawings, each circuit acts in the following way. The rotation control circuit 14 receives the output indication of the graphic pattern rotation angle generator 3 to control the rotation angle of the graphic pattern as described above. Numeral 17 denotes a decoder which receives codes on alphanumerals or marks representing place-names and marks stored in the memory unit 10, decodes and sends them to an image memory unit 16, i.e., to be placed at two-dimensional coordinates indicated by the shifted X—Y coordinates by virtue of control unit 15, as described below.

As described above, according to the present invention there is provided a system for display of images on the screen which comprises: (a) an alphanumeric data memory unit which stores codes corresponding to the letters and marks and their positions on the screen; (b) a graphic pattern memory unit; (c) a coordinate position shift circuit which changes the position of the letters and marks; (d) an image control unit wherein the graphic pattern is rotated through an angle specified by the graphic pattern rotational signal generator and the letters or marks corresponding to the alphanumeric codes stored within the alphanumeric data memory unit are superimposed on the graphic pattern, whereby the displayed letters and marks themselves do not incline at the rotation angle of the graphic pattern and shifts their displayed positions according to the rotational movement of the screen even if the graphic pattern is rotated at an angle depending on, e.g., the vehicle traveling direction. Therefore, it is practical and advantageous to utilize such a system as described above for displaying a road map image on a screen mounted in an automotive vehicle. For example, when the vehicle is turned right or left by an operator driving in a target direction as viewed from the map, the traveling direction of the vehicle is always at the top of the screen, but the letters and marks superimposed on the map do not rotate when the map is rotated, and thus facilitated recognition of the letters indicating place-names and other marks can be achieved.

What is claimed is:

1. Apparatus for displaying on a screen a graphic pattern and characters superimposed at predetermined positions on said graphic pattern comprising:

first memory means for storing graphic data from which said graphic pattern is generated on said screen;

second memory means for storing coded data from which said characters are generated on said screen, and for storing positional data for said predetermined positions on said graphic pattern;

signal generator means for outputting a command signal to rotate through an angle $\theta$ said graphic pattern as displayed on said screen;

shift circuit means connected to said second memory means and said signal generator means for providing shifted positional data in accordance with the command signal; and image control means connected to said first memory means, said second memory means, said shift circuit means, said signal generator means, and said screen for causing said graphic pattern to be rotated through said angle $\theta$ as displayed on said screen, and for using said shifted positional data for superimposing said characters on said graphic pattern as displayed on said screen at said predetermined positions with respect to said graphic pattern so that said characters have a vertical orientation on said screen independent of said rotation of said graphic pattern.

2. An apparatus as claimed in claim 1, wherein said shift circuit means shifts said positional data according to the expressions $X_1' = X_1 \cos\theta + Y_1 \sin\theta$ $X_1' = -X_1 \sin\theta + Y_1 \cos\theta$ wherein $X_1$ and $Y_1$ denote rectangular coordinates of said characters on said screen at said predetermined position on said graphic pattern before said graphic pattern is rotated through the angle $\theta$, and $X_1'$ and $Y_1'$ denote new rectangular coordinates of said characters on said screen at said predetermined position on said graphic pattern after said graphic pattern has been rotated through the angle $\theta$.

3. An apparatus as claimed in claim 1, wherein said graphic pattern stored as graphic data in said first memory means is a road map, and said characters stored as coded data in said second memory means includes place-names and other designations for said road map.

4. An apparatus as claimed in claim 3, wherein said signal generator comprises means for detecting an orientation of a vehicle containing said screen, and for causing said command signal to be outputted according to said vehicle orientation.

5. A method of displaying on a screen a graphic pattern and characters superimposed at predetermined positions on said graphic pattern comprising the steps of:

(a) storing graphic data from which said graphic pattern can be generated on said screen;

(b) storing coded data from which said characters can be generated on said screen:

(c) storing positional data for predetermined positions of said characters on said graphic pattern;

(d) generating a command signal that said graphic pattern is to be rotated through an angle;

(e) shifting said positional data according to said command signal; and (f) controlling display on said screen of said graphic pattern according to said stored graphic data, and said characters according to said stored coded data, by rotating said graphic pattern through said angle, and using said shifted positional data to superimpose said characters at said predetermined positions on said graphic pattern so that said characters have an orientation with respect to vertical on said screen independent of said rotation of said graphic pattern.

6. A method of displaying on a screen a graphic pattern and characters superimposed at predetermined positions on said graphic pattern for a vehicle road map display system comprising the steps of:

(a) storing graphic data from which said graphic pattern can be generated on said screen;

(b) storing coded data from which said characters can be generated on said screen;

(c) storing positional data for predetermined positions of said characters on said graphic pattern:

(d) sensing the orientation of said vehicle;

(e) rotating said graphic pattern in accordance with the sensed orientation of the vehicle;

(f) shifting said positional data according to degree of graphic pattern rotation; and (g) controlling display on said screen of said graphic pattern according to said stored graphic data, and said characters according to said stored coded data, by rotating said graphic pattern, and using said shifted positional data to superimpose said characters at said predetermined positions on said graphic pattern so that said characters have a vertical orientation on said screen independent of said rotation of said graphic pattern.

* * * * *